Sept. 8, 1953  R. K. DAVIES  2,651,115
EDUCATIONAL DEVICE
Filed Aug. 25, 1950
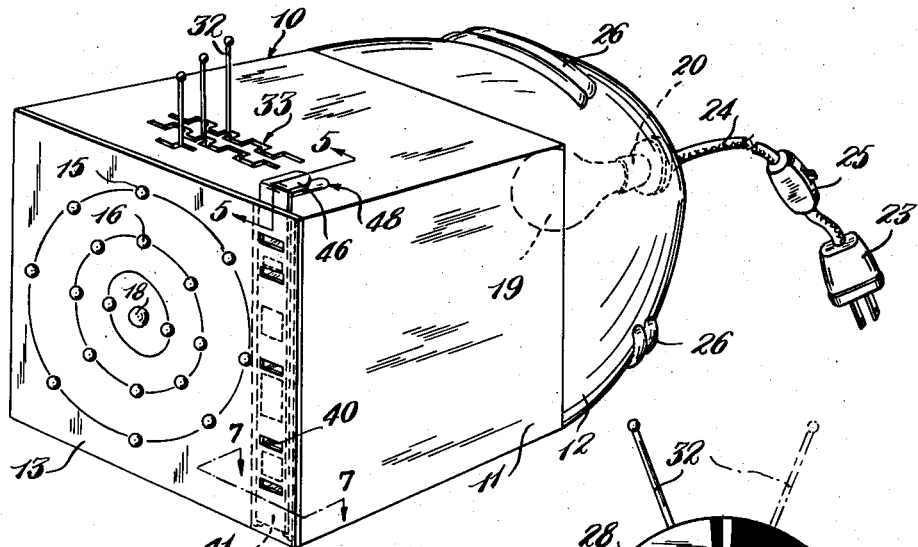
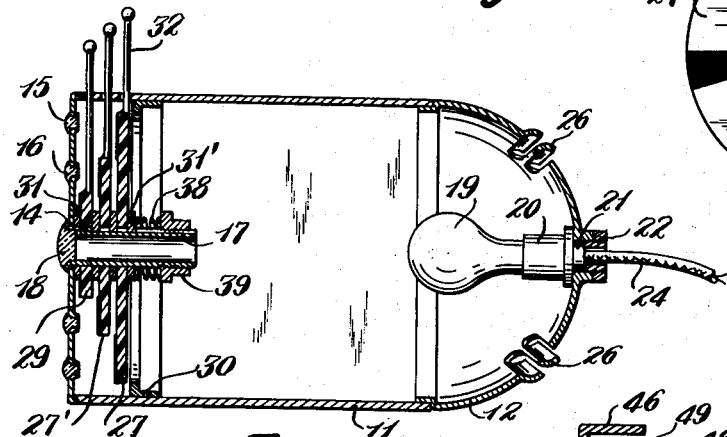
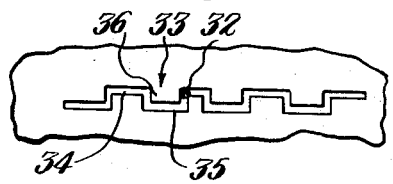
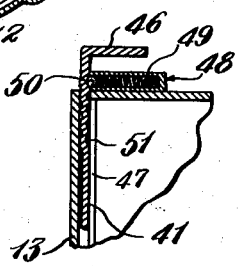
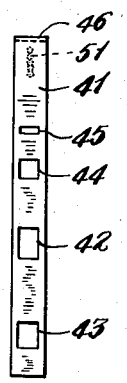
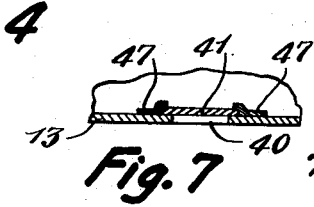
INVENTOR.
RALPH K. DAVIES
BY Hudson, Boughton,
Williams, David & Hoffmann
ATTORNEYS Patented Sept. 8, 1953

2,651,115

UNITED STATES PATENT OFFICE 2,651,115

EDUCATIONAL DEVICE

Ralph K. Davies, Berea, Ohio

Application August 25, 1950, Serial No. 181,503

13 Claims. (Cl. 35—19)

This invention relates to an educational device and, more particularly, to an apparatus for visually representing atomic structure and theories based thereon.

Instructors have heretofore experienced considerable difficulty in attempting to establish in the minds of pupils entering upon studies of chemistry and physics a concept of the structure of an atom. Numerous charts and models have been devised in an effort to assist textual explanations, but these have proved inadequate either because they fail to provide an image or concept which can be remembered or because they require an undue amount of manipulation distracting both the instructor and students and thus interfering rather than aiding in proper presentation of the subject. Nevertheless, it has been recognized that some means is necessary to impress upon the minds of the students the basic concepts of atomic structure in order that they may more readily grasp more intricate theories and instructions in which such structure forms an intimate part. For example, in the instruction of chemistry an understanding of the nature of the different chemical elements, why they differ from each other, how they enter into chemical combinations, and a multitude of other phenomena can be explained only on the basis of the atomic structure of the atoms.

Modern atomic science has evolved a very complex concept of the atom involving a considerable number of different type particles, both charged and uncharged, and there is not complete agreement as to what is a proper composite picture or model of atomic structure or even what such a picture or model should include. However, many phenomena of physics and chemistry, relating to actions of atoms and their natures, can be explained on the basis of a much simpler concept. Such a concept, originally postulated by Niels Bohr and which has been further developed by Lewis and Langmuir, represents the atom in the form of a positively charged nucleus about which are arranged electrons similar to the planetary system with the nucleus being the sun and the electrons the planets. These electrons surrounding the nucleus, sometimes referred to as orbital electrons or planetary electrons, differ in number and arrangement for each different chemical element, the number of electrons in any given orbit being predetermined. Thus, the hydrogen atom has a central nucleus and a single orbital electron; the helium atom has two orbital electrons in the same ring or shell; neon has 10 orbital electrons arranged in two completed shells, etc. In accordance with this picture of the atom, the first shell or orbital ring contains two electrons when completed, the second and third orbital rings or shells each contain eight electrons when completed, and the number of electrons in any completed ring or shell can be found to be expressed by the formula $2N^2$ where N takes successive values: 1, 2, 2, 3, 3 and 4. An atomic picture or model of this type forms a convenient basis for beginning instruction of chemical characteristics and reactions as well as for elementary instructions in the physics of the atom. Unfortunately, however, a suitable means for visually demonstrating the arrangement of the nucleus and electrons of atoms in accordance with such a model or theory has not been available heretofore.

An object of this invention is, therefore, to provide a novel educational device such that the structure of different individual atoms and the nature of the union of different atoms in chemical combinations can be easily visually represented with a minimum effort and attention.

Another object of the invention is to provide an improved educational device for representing atomic structure in the form of separate spots of light for the nucleus and orbital electron or electrons of the atom represented, means being provided for manually altering the number and positions of the spots of light to thereby represent the structures of different atoms.

A further object of the invention is to provide an improved educational device as defined in the preceding paragraph and wherein means are provided to indicate the linking bond or bonds between one or more atoms and/or the valence of a given atom.

An additional object of the invention is to provide an improved educational device for representing the nucleus and orbital electrons of an atom by means of individual spots of light which may be individually selectively established or terminated to represent different numbers of orbital electrons and hence different atoms, the device being embodied in a self-contained box or chamber with no loose parts to be lost or disarranged and the different atomic structures being readily shown by manually manipulating a few levers without the need of close attention so that an impressive visual aid device is provided which may be manipulated by an instructor without interfering with his lecture.

A more specific object of the invention is to provide an educational device of the character described comprising a chamber provided with a plurality of apertures arranged in accordance with the nucleus and orbital electrons of an atom with a light source within the chamber and shutter means for selectively permitting and preventing the passage of light through the apertures so that atomic structure of different atoms may be readily demonstrated as spots of light by moving the shutter means.

Another object of the invention is to provide an educational device of the character described in the preceding paragraph wherein the said chamber has a plurality of elongated slots extending outward from at least some of the apertures representative of electrons of an atom together with shutter means for selectively permitting and preventing the passage of light through said slots so that the valence of an atom or the linking bonds of one atom with another may be readily demonstrated.

The invention further resides in certain novel features of construction and combination and arrangements of parts, and further objects and advantages thereof will be apparent to those skilled in the art to which the invention pertains from the following description of the present preferred embodiment thereof, and certain modifications, described with reference to the accompanying drawings in which identical parts in the several views are designated by the same reference characters and in which, Fig. 1 is a perspective view of the present preferred embodiment of a device or apparatus embodying this invention;

Fig. 2 is a longitudinal vertical sectional view of the device shown in Fig. 1;

Fig. 3 is a detached view of one of the rotatable shutters of the device;

Fig. 4 is an enlarged fragmentary elevational view of a portion of the top of the device illustrated in Fig. 1, showing one means for indicating the position of a rotatable shutter;

Fig. 5 is a fragmentary sectional view taken substantially on the line 5—5 of Fig. 1;

Fig. 6 is a detached front elevational view of the longitudinally movable shutter of the device, and Fig. 7 is a fragmentary sectional view through the front panel and the longitudinally movable shutter of the device and taken substantially on the line 7—7 of Fig. 1.

The educational device of this invention preferably comprises a box-like housing or chamber, generally designated 10, which may be formed of wood, sheet metal, or other suitable materials. In the illustrated embodiment, the device is shown as constructed of sheet metal and comprises an open-ended portion 11 of rectangular cross-section, the rear of which is closed by a curved portion 12 which may be semi-spherical, parabolic, or other suitable shape for a purpose hereinafter described. The forward end of the housing or chamber 10 is closed by a front panel or cover plate 13 preferably planar and suitably secured to the portion 11. This front panel or forward portion 11 is provided with a plurality of apertures there being a central hole or opening 14 of larger diameter than the other openings 15 which are arranged in concentric circles about the central opening. As will be seen with reference to Fig. 1, the rings of openings 15 represent orbital electrons of an atom and hence there are two openings in the first ring, eight in the second, and eight in the third. While only three rings of openings 15 have been indicated in the drawing, it will be apparent that additional rings of openings may be provided to represent additional orbits or shells of electrons, the number of openings in the several rings or orbits being determined in accordance with the above-mentioned formula for the number of electrons in the completed atomic shells or orbits.

Each of the openings 15 is intended to be selectively rendered visible by having light project therethrough or to be selectively obscured by cutting off the said light. To increase the visibility of the openings without materially increasing their size, the said openings 15 are preferably provided with lenses 16 which may be formed of glass, clear plastic or the like and are preferably frusto-conical with rounded outer ends as shown most clearly in Fig. 2. These lenses may be conveniently mounted in the face plate or front panel 13 by punching the plate 13 to inwardly upset a portion of the material around the openings 15 thereby providing frusto-conical seats for the lenses which may then be simply frictionally held in place or cemented in the openings as may be desired. In the event it be desired to form the forward plate or face 13 of wood, a similar result can be achieved by employing a relatively thick panel and countersinking holes with tapering sides for the reception of the lenses 16.

The nucleus of an atom is many times heavier than the orbital or planetary electrons and hence is to be represented by a much larger body in the atomic model. Therefore, the central opening 14 of the device is larger than the openings 15 for the electron representations. In addition to conveying a truer picture of the atomic structure, this increased size of the opening 14 is advantageous because it provides a convenient means for mounting shutter mechanism to control the passage of light through the openings 15 and the lenses 16 in representing atoms with different numbers of orbital electrons. For this purpose, the device as illustrated has a hollow tubular member 17 secured to the front panel or face 13 and extending rearwardly therefrom. In the illustrated embodiment, this tubular member 17 has a portion extending through the opening 14 and peened or otherwise deformed over the periphery of the opening securing the tubular member 17 in place. The outer end of the tubular member 17 is also preferably provided with a lens 18 which may be formed of glass, plastic or the like and has a substantially cylindrical portion fitted into the outer end of the tube 17 with a convex outer surface for spreading the light emerging therethrough.

Any suitable source of light may be employed for use with the device, but in the present preferred construction the entire apparatus is self-contained and hence a source of light is provided within the chamber of box 10. This source of light comprises an incandescent lamp bulb 19 centrally located in the rear portion 12 of the housing or chamber by having its base secured in a socket 20 which is in turn mounted centrally of the rear portion 12 of the chamber or housing by conventional means including a threaded tubular portion 21 extending through the wall of the portion 12 and having a nut 22 screwed thereon. Electrical energy for illuminating the lamp 18 may be provided from a conventional electrical outlet through the plug 23 and the wire 24 under control of an off-on switch 25. Preferably the portion 12 is provided with one or more slots or louvres 26 to facilitate circulation of air for carrying away the heat engendered by the lamp. As mentioned heretofore, the rear portion 12 of the housing or chamber is semi-spherical or parabolic and is so shaped as to serve as a reflector to direct the light forwardly of the box or chamber and through the openings 14 and 15 representing the nucleus and orbital electrons of the atom.

Selective control of the number and arrangement of orbital electrons which may be rendered visible is readily effected by means of rotatable shutters manually positionable by levers extending externally of the housing or chamber. These shutters preferably comprise disks of glass or transparent plastic 27 having opaque portions 28 thereon for selective positioning opposite the openings 15 to obscure the light normally passing therethrough, there being one such shutter or disk for each of the circles or orbits of openings 15.

The arrangement of the opaque portions 28 upon the shutter 27 is such that rotation of the shutter in steps through approximately one-eighth of a revolution is sufficient to selectively obscure all of the openings 15 in the corresponding ring or orbit and to sequentially uncover each of the orbital electrons therein. The manner in which this may be achieved is represented in Fig. 3 wherein one of the shutters for an orbit having eight openings is shown. As shown in that figure, when the shutter 27 is positioned with the smallest opaque portion aligned with one of the openings 15, the other opaque portions 28 will be likewise positioned in alignment with the others of the openings in that ring or orbit. Moving the shutter or disk 27 clockwise, as viewed in Fig. 3, an angle distance equal to the arcuate extent of the smallest of the opaque portions 28 will uncover one of the openings 15, namely, that one initially aligned with said smallest opaque portion, while each of the other of the openings 15 in that ring will remain obscured. Moving the shutter 27 clockwise an additional arcuate distance equal to the width of the smallest opaque portion 28 will uncover the next orbital electron opening 15 in that ring and thus each succeeding opening 15 for that orbit may be uncovered by sequentially moving the disk 27 clockwise in units represented by the width of the narrowest opaque portion 28 until after nine such movements, all of the openings 15 in a given ring or orbit having eight openings will be uncovered.

The shutter for each ring of openings 15 has an outer diameter slightly greater than the diameter across the outer edges of the openings 15 of that ring or orbit and has opaque portions 28 equal in number with the number of openings in the corresponding ring or circle. Thus, for the two outer rings or orbits shown, the shutters 27 and 27' each have eight opaque portions of sizes having the relationships explained above and illustrated in Fig. 3, while the shutter 29 for the inner ring or orbit need have but two opaque portions, as will be readily understood, since there are but two openings 15 in this ring or orbit. The radial extent of the opaque portions 28 of each shutter is substantially equal to the difference in radius between that shutter and the next smaller so that light can shine through the inner portions of the larger shutters for the openings 15 of the inner electron ring. In order to prevent stray light rays from reaching the openings 15 around the shutters 27, 27' and 29 a stationary shutter or light blocking member 30 may be provided in the housing or compartment adjacent the largest movable shutter. This stationary shutter has a circular opening therethrough of the same or slightly less diameter than that of the shutter 27. Stray light can be further reduced by using a non-reflecting surface on the interior of the portion 11 of the housing.

The shutters 27, 27' and 29 each have a central opening therethrough for rotatable mounting in spaced relationship upon the previously mentioned tube 17, the shutters being axially spaced from each other by means of washers 31 interposed therebetween and between the shutter 29 and the rear face of the forward panel 13. Movement of the shutters may be effected by any suitable means, but the device is herein illustrated as having separate actuating levers or rods 32 attached to each of the shutters 29, 27 and 27', which rods extend through the top of the housing or chamber 10 through slots therein so that the shutters may be conveniently individually moved. In order to facilitate easy identification of the particular shutter actuating rod so that the instructor need not look at the device while manipulating it, the rods or levers 32 may be made of different lengths, as shown, with the shortest rod provided for the smallest shutter 29 and each of the succeeding rods of progressively greater length. Alternatively, the rods 32 may be provided with knobs of different configurations or other expedients may be employed for easily identifying the rods by touch.

A means is also preferably provided to facilitate locating each of the shutters in its several positions so that the opaque portions 28 thereof are exactly aligned with or out of alignment with the openings 15 as described above, thus enabling the instructor to easily set a given shutter to a predetermined position providing illumination through a known number of apertures 15 without the necessity of visually inspecting the panel 13. To facilitate such tactile manipulation and positioning of the shutters, any known expedient may be employed. In the illustrated embodiment, however, the slots such as 33 through which the rods extend have parallel portions offset with respect to each other and connected by portions extending at right angles thereto. Thus, as shown more clearly in Fig. 4, the slot 33 has parallel portions 34 and 35 offset with respect to each other and united at their adjacent ends by a portion 36 extending at right angles therethrough. The lever or rod 32 moves in this slot with the distance of movement along one portion such as 34 corresponding to the movement necessary to arcuately move the corresponding shutter a unitary distance equivalent to the smallest opaque portion 28 thereof. Since the top of the box or chamber 10 is shown planar, while the movement of the disks or shutters such as 27 is rotary, the lengths of the horizontal portions such as 34 and 35 are of necessity different for corresponding arcuate distances of movements of the shutter.

It will be readily understood that, with the construction just described, the shutter 27 will have the opaque portions 28 positioned in a certain definite relationship with respect to the corresponding openings 15 in the panel 13 when the rod 32 is at one end of a portion of the slot, such as the portion 34. Movement of the rod 32 to the other end of the portion 34 of the slot will move the shutter 27 a distance equal to the width of the narrowest opaque portion 28 thereby uncovering one of the openings 15. This can be readily determined by sound and feel, since the rod 32 will abut against one side of the connecting portion 36 of the slot and in order to continue rotation of the shutter, the rod 32 must be displaced slightly sidewise to enter the portion 35 of the slot whereupon it may be moved therethrough to uncover the next of the openings 15. Just after the next opening 15 is uncovered the rod 32 comes to the end of the portion 35 of the slot and must be again displaced to continue its movement. This action is repeated until all of the openings in a given electron orbit have been uncovered or covered depending upon the direction of movement of the rod.

In order to prevent movement of one shutter from causing undesired movement of the other shutters, and in order to prevent accidental displacement of shutters from their adjusted positions, a frictional force is imposed thereon. For this purpose, the washers 31 intermediate the shutters are held from rotation by any suitable means; for example, by having an integral tongue 31' thereon engaged in an axially extending slot or groove 37 of the tube 17. A similar washer is provided at the rear of the rearmost shutter such as 27 and behind this last washer is placed a coil spring 38 which is held in place and its compression adjusted by means of a nut 39 screwed upon the threaded outer end of the tube 17. It will be evident therefore that by screwing the nut 39 inwardly a desired friction may be imposed on the shutters such as 27, 27' and 29 so that the latter may not be easily jarred from their adjusted positions. Moreover, movement of one shutter cannot be transmitted to the others since the intervening washers 31 are held from rotation.

In addition to illustrating the orbital or planetary electrons of an atom, the device of this invention can also be used to indicate the valence of an atom and/or its linking bond or bonds with another atom or atoms. For this purpose, at least one side of the housing 10 is provided with horizontally extending slots 40 in alignment with the openings 15 in the outer ring or orbit of openings. These slots are adapted to be selectively uncovered in a predetermined order by a longitudinally moving shutter member, here shown as a strip of metal 41, having apertures 42, 43, 44 and 45 therein of different lengths for cooperation with the openings 40. Movement of the strip 41 is effected in a vertical direction by means of a handle portion 46 provided thereon exteriorly of the top of the device, the strip 41 being guided in its movement by suitable lugs or channels, such as 47, provided upon the rear of the front panel 13. The slot 42 has a length equal to five times the vertical dimension of an opening 40. The opening 43 has a length equal to four times the vertical dimension of an opening 40, opening 44 has a length equal to three times the vertical dimension of an opening 40, while the opening 45 has a width equal to the width of a slot or opening 40. Hence, by moving the strip 41 vertically upwardly in successive steps, each equal to the vertical dimension of one of the slots 40, the said slots can be selectively uncovered through a relatively short total movement of the strip; the middle slot being first uncovered, then the next lower, followed by the next upper, then the lowest, and finally the uppermost, each slot remaining uncovered until all have been uncovered as the strip is continuously moved upwardly. The length of the strip 41 below the opening 43 therein is equal to four times the vertical dimension of a slot 40 and hence a separate opening need be provided for the lowermost slot 40, the latter being controlled simply by the lower edge of the strip as will be readily apparent.

A means is preferably provided for audibly and tactilely indicating to the instructor the extent of movement of the strip 41 and hence the number of openings 40 which are uncovered. Any suitable means may be provided for this purpose but in the illustrated embodiment the device is shown as comprising a spring detent, generally designated 48, mounted upon the top of the housing 10 and comprising a coiled spring 49 normally urging a ball 50 into engagement with one of a plurality of dimples or depressions 51 provided upon the adjacent surface of the strip 41. Hence, as the strip 41 is pulled upwardly one step per unit, the ball detent will snap into a corresponding one of the depressions or dimples 51 with a click retaining the strip in that position until it is positively displaced therefrom by a pull or a push exerted upon the strip. The strip 41 is so designed that at its lowermost position all the openings 40 are covered, the openings being progressively uncovered in the order mentioned upon moving the strip or shutter 41 vertically upwardly successive steps each equal to the vertical dimension of a slot 40 and each represented by a click of the detent 48.

It is believed that the operation of the device will now be apparent from the foregoing detailed description. However, in order that the construction may be more fully appreciated, one mode of using the device will be mentioned. Let it be assumed that the instructor is lecturing upon the chemical differences between the elements and is developing that these differences are due to their different numbers of orbital electrons. He may then turn on the light 24 of the device mentioning that the spot of light seen through the lens 18 is indicative of the nucleus of the atom and that arranged about this nucleus are disposed electrons in spaced rings or orbits like the planets about the sun, the number of electrons and their position in a given ring indicating the nature and behavior of the corresponding atom. Thus, for hydrogen he may move the forwardmost lever or rod 32 one space to uncover one of the openings 15 in the first circle or orbit so that only the nucleus and one of the orbital electrons are shown as spaced spots of light of different sizes. He may then explain that helium has two oribtal electrons, at the same time moving the same lever or rod 32 to uncover the other opening 15 in the innermost circle or ring. This completes a first atomic series and constitutes a stable element since the number of electrons in its ring are satisfied. The instructor may then go on to indicate that when electrons are added in the next orbit the chemical nature of the corresponding elements is different, simultaneously moving the middle lever or rod 32 to uncover an opening 15 in the second circle or orbit simultaneously explaining the significance thereof, then uncovering another opening and thus proceeding until he had progressed through the desired portion or all of the elements of the periodic table. In this regard it should be noted that while but three rings or orbits of openings 15 are here illustrated, additional rings of openings and shutters therefor may be provided if desired. The valence of any given atom thus mentioned can be shown by uncovering a corresponding number of adjacent slots 40 and for this purpose the device may be provided with a second set of such slots, adjacent the left hand side of the face panel 13 as viewed in Fig. 1, and controlled by a shutter similar to the strip 41.

In addition to demonstrating the atomic structure of any single atom, the use of two or more such devices of the type here illustrated will permit a demonstration or illustration of the manner in which chemical combinations or compounds are effected. Thus, hydrogen chloride can be shown by establishing upon one box or device a representation of hydrogen by uncovering one orbital electron and then in the adjacent box or device establishing a representation of chlorine by uncovering seventeen orbital electrons, two in the innermost ring, eight in the next succeeding ring or orbit, and seven in the outermost ring, the bond or union between the two atoms being represented by uncovering a slot such as 40 extending from the hydrogen electron to the dark portion where the last electron in the outer orbit of the chlorine atom would appear had the shell been complete. By similar manipulations other compounds may be represented, complex compounds being shown by utilizing separate ones of the devices for each separate atom of the compound. Alternatively, two or more sets of concentric openings 15 and cooperating shutters as well as more than one set of slots 40 and cooperating shutters may be provided in a single box or chamber if desired. Also, slots and shutters similar to 40 and 41 may be provided at both the top and bottom of a single box as well as at one or more sides thereby increasing the number of linking bonds and facilitating the demonstration of more complex molecules.

In addition to the above-mentioned mode of operation of the apparatus, it will be apparent that the latter may be utilized for indicating other properties of atoms and compounds. Moreover, to facilitate utilization of the device the front panel 13 may be provided with suitable indicia such as a positive sign or mark for the nucleus and negative signs adjacent the openings 15 representing the electrons as well as other pertinent information. Also, to faciiltate showing of the rings occupied by the several electrons, lines may be drawn upon the face of the panel 13 as indicated in Fig. 1 or arcuate slots may in some cases be cut through the panel intermediate the openings and which are uncovered by suitable shutter means. In addition, the color of the lenses 16 employed in the openings 15 may be different for each different orbit to facilitate identification thereof, and the lens 18 for the nucleus may be yet another color, if desired.

It will also be appreciated that numerous modifications may be made in the details of construction of the device without departing from the spirit and scope of the invention. Thus, in place of employing transparent shutters with opaque portions, the shutters could be formed of opaque material with openings for transmission of light intermediate the opaque portions indicated 28 in the drawing. Also, means other than the illustrated offset slots may be employed for facilitating locating and holding the rotatable shutters in a given position. Likewise, separate shutters may be employed for the openings 40 instead of the single strip shutter 41. Moreover, if it be desired to omit the slots 40 and shutter 41, the valences or linking bonds of the atoms can be conveniently represented by rods or tubes of glass, plastic or the like suitably retained in place. For example, where tubes are employed for this purpose the ends thereof can be bent at right angles to the main body and adapted to fit over the protruding portions of the lenses 16. These and other modifications will readily occur to one skilled in the art to which the invention relates after having had the advantage of this disclosure and hence the invention is not to be considered as limited to the embodiment herein illustrated and described except as required by the spirit and scope of the appended claims.

Having thus described the invention, I claim:

1. An educational device of the character described comprising a chamber having a side thereof provided with an aperture representative of the nucleus of an atom and a plurality of apertures in concentric rings about the first-mentioned aperture and representative of the orbital electrons of atoms, a sorce of light in said chamber, and shutter means rotatably supported in said chamber between said source of light and said apertures and including arcuate opaque and light transmitting portions of different arcuate lengths for selectively intercepting or permitting passage of light through the apertures representative of the orbital electrons, whereby atomic structure of different atoms may be demonstrated.

2. An educational device of the character described comprising a chamber having one side thereof provided with an opening representative of the nucleus of an atom and encircled by a plurality of spaced openings arranged in concentric circles representative of the orbital electrons of atoms, a source of light in said chamber, and shutter means rotatably supported in said chamber for controlling the passage of light through the openings in each of said circles of openings, there being a single separate shutter means for each of said circles operatable to selectively permit or prevent passage of light through the corresponding openings, whereby the atomic structure of different atoms may be demonstrated as separate spots of light.

3. An educational device as defined in claim 2 and wherein the said separate shutter means comprise separate transparent disks having spaced opaque areas thereon for selective positioning between said apertures and the said source of light.

4. An educational device as defined in claim 3 and further comprising a manually operatable means connected with each of said disks and extending exteriorly of said chamber for actuating said disks.

5. An educational device as defined in claim 2 and further comprising lens means in each of said apertures for spreading the light transmitted therethrough.

6. An educational device of the character described comprising an opaque member having a plurality of apertures capable of transmitting light therethrough and arranged to represent the nucleus and orbital electrons of atoms, said member also having elongated light transmitting slots extending outwardly from at least some of the apertures representative of electrons, means for selectively permitting and preventing passage of light through the said apertures representative of electrons, and means for selectively covering and uncovering said slots, whereby the atomic structure of different atoms and their valences or linking bonds with other atoms may be demonstrated.

7. An educational device of the character described comprising a chamber provided with a plurality of apertures arranged in accordance with the nucleus and orbital electrons of atoms, the said chamber also having elongated slots extending outwardly from at least some of the apertures representative of the electrons, a source of light within said chamber, shutter means for selectively permitting and preventing the passage of light through said apertures representative of electrons, and other shutter means for selectively permitting or preventing passage of light through said slots, whereby the atomic structure of different atoms and their valences or linking bonds with other atoms may be demonstrated.

8. An educational device of the character described comprising a substantially opaque chamber provided with a plurality of apertures in one side thereof arranged to represent the nucleus and the orbital electrons of an atom, a source of light within said chamber, a plurality of rotatable shutters concentrically journalled for rotation adjacent the said apertured portion of the chamber, the said shutters having opaque portions for selectively permitting and preventing passage of light from said source through the said apertures, separate manually operable means connected with each of said shutters and extending exteriorly of said chamber for effecting rotation of said shutters, and means cooperating with each of said shutter operating means to indicate the adjusted position of the corresponding shutter.

9. An educational device of the character defined in claim 8 and wherein the said indicating means comprises means cooperating with said manual means for audibly and tactilely indicating the position of the latter and hence of the corresponding shutter.

10. An educational device of the character described comprising a substantially opaque housing provided with a plurality of apertures in one side thereof arranged to represent the nucleus and the orbital electrons of an atom, a source of light within said housing, a plurality of rotatable shutters concentrically journalled for rotation adjacent the said apertured portion of the housing, the said shutters having opaque portions for selectively permitting and preventing passage of light from said source through the said apertures, separate manually operable means connected with each of said shutters and extending exteriorly of said housing for effecting rotation of said shutters, means cooperating with said shutter operating means to indicate the adjusted position of the latter, and means to indicate the valences or linking bonds of the atoms demonstrated.

11. An educational device of the character described comprising a substantially opaque housing provided with an aperture representative of the nucleous of an atom and a plurality of apertures arranged in concentric rings about the first-mentioned aperture and representative of the orbital electrons of atoms, a source of light within said housing, a plurality of rotatable shutters concentrically journalled for rotation adjacent the said apertured portion of the housing, there being one of said shutters for each ring of apertures with each shutter having opaque portions for selectively permitting and preventing passage of light from said source through the apertures in the corresponding ring, separate manually operable means connected with each of said shutters and extending exteriorly of said housing for effecting individual rotation of said shutters, and means cooperating with said shutter opearting means to indicate the adjusted position of the latter.

12. An educational device as defined in claim 11 wherein the said opaque portions on each shutter are arranged adjacent the periphery thereof in spaced relationship with the arcuate extents of said opaque portions being different whereby the apertures of a ring are progressively uncovered by rotatable movement of the corresponding shutter.

13. An educational device as defined in claim 11 wherein the said shutters are separate transparent disks having different outer diameters corresponding respectively to the diameters of the rings of apertures, and the said opaque portions are spaced annular portions of different arcuate extents adjacent the peripheries of said disks.

RALPH K. DAVIES.

References Cited in the file of this patent

UNITED STATES PATENTS

| Number | Name | Date |
| --- | --- | --- |
| 78,408 | Wrug | May 26, 1868 |
| 1,368,608 | Currois | Feb. 15, 1921 |
| 1,837,948 | Carpenter | Dec. 22, 1931 |
| 1,880,026 | Singerman | Sept. 27, 1932 |
| 2,200,060 | Geiser | May 7, 1940 |
| 2,443,631 | McDermott et al. | June 22, 1948 |
| 2,477,179 | Hart | July 26, 1949 |
| 2,516,418 | Ramsay | July 25, 1950 |